United States Patent

Slivensky

[11] Patent Number: 6,167,118
[45] Date of Patent: Dec. 26, 2000

[54] METHOD AND A SYSTEM FOR BY-PASSING A RECEIVER-OFF-HOOK TIMER FOR VOICE DIALING SYSTEMS AND FOR SUPPORTING SPOKEN DIGIT DIALING

[75] Inventor: Alan J. Slivensky, Leander, Tex.

[73] Assignee: DSC Telecom L.P., Plano, Tex.

[21] Appl. No.: 09/001,182

[22] Filed: Dec. 30, 1997

[51] Int. Cl.[7] .......................... H04M 1/64; H04M 11/00; H04M 1/00
[52] U.S. Cl. .................. 379/88.03; 379/80; 379/100.16; 379/355
[58] Field of Search ............................... 379/67.1, 69, 80, 379/88.01, 88.03, 100.14, 100.16, 190, 199, 213, 216, 219, 220, 233, 235, 90.01, 93.01, 93.05, 355, 356, 352; 704/234–275

[56] References Cited

U.S. PATENT DOCUMENTS

| | | | |
|---|---|---|---|
| 4,481,382 | 11/1984 | Villa-Real | 455/556 |
| 4,870,686 | 9/1989 | Gerson et al. | 381/43 |
| 4,928,302 | 5/1990 | Kaneuchi et al. | 379/88 |
| 4,959,850 | 9/1990 | Marui | 379/58 |
| 4,961,212 | 10/1990 | Marui et al. | 379/67 |
| 5,185,781 | 2/1993 | Dowden et al. | 379/67 |
| 5,325,421 | 6/1994 | Hou et al. | 379/67 |
| 5,483,579 | 1/1996 | Stogel | 379/88 |
| 5,864,607 | 1/1999 | Rosen et al. | 379/90.01 |

*Primary Examiner*—Krista Zele
*Assistant Examiner*—Allan Hoosain
*Attorney, Agent, or Firm*—Kenyon & Kenyon

[57] ABSTRACT

A blended callflow method in which a spoken digit dial option is added to the caller options for dialing. By automatically switching from an implicit to an explicit mode during such an option, without requiring an explicit command from the caller, the present invention allows a more detailed call flow and allows the caller to confirm the number's accuracy, prior to dialing. The method may also switch between modes where spoken input is received near the expiration of a receiver offhook (ROH) timer.

18 Claims, 4 Drawing Sheets

METHOD AND A SYSTEM FOR BY-PASSING A RECEIVER-OFF-HOOK TIMER FOR VOICE DIALING SYSTEMS AND FOR SUPPORTING SPOKEN DIGIT DIALING

BACKGROUND OF THE INVENTION

1. Field of Invention

The present invention relates to a voice recognition method and a system for use with a telephone dialing, and more particularly to a callflow dialog that automatically transfers between different dialing modes.

2. Description of the Prior Art

A conventional telephone network switch has a timeout period, i.e. Receiver Off Hook ("ROH timer") to indicate when a telephone receiver is placed offhook and there is no activity on that line. Since this switch considers dialing to be the only detectable "activity", a voice dialog between a caller and a voice recognition system does not normally disengage the ROH timer. Therefore, callflow dialogs prior to connection must typically be constructed to be complete before the ROH timeout occurs, i.e. within 10–20 seconds after the handset is taken offhook. This significantly constrains interaction options.

A conventional Voice Activated Dialing (VAD) service, such as Bell Atlantic's Easy Voice™, uses an in-band switch protocol such as a Network Facility Access (NFA) protocol or a Proxy protocol. Both of these protocols provide the capability to connect an Intelligent Peripheral (IP) that performs voice recognition for enhanced voice-enabled services. These in-band protocols use the seize signal, the wink signal, and dual tone multiple frequency (DTMF) tones to transmit call setup and control information. The system has a switch interface which interprets two bit patterns: onhook and offhook. These patterns correspond to "00" for an offhook state and "11" for an onhook state. The VAD switch interface distinguishes a "seize" signal from the switch as a transition from the onhook to the offhook states; "wink" is a transition from the offhook to the onhook state and then back to the offhook state.

The following description discusses the NFA/Proxy protocol related problem of the above VAD application in particular, however, the problem and solution should apply to any switch protocol that uses an ROH timer. VAD callflows for the VAD system above may be initiated in the "implicit" mode. The caller has generally three options: (1) manually dial a number using DTMF tones, (2) speak a name (e.g., "John Smith") contained in a VAD directory, and have the VAD dial the corresponding number that is stored in the VAD directory, or (3) speak the directory management command (e.g., "directory") or dial the corresponding star-code command (e.g. "*44") to get into the explicit directory management mode.

The NFA and Proxy switch protocols are similar. They both provide two modes of operation. One mode is an implicit mode which occurs automatically when a provisioned caller line is taken offhook. During the implicit mode a DTMF receiver is enabled only to listen for DTMF signals. In addition, the ROH timer is also enabled. Another mode is an explicit mode which conventionally occurs when a star code, for example "*XX" ("X" representing a DTMF numerical signal), is entered via DTMF signals. Once the star code is entered and transition to the explicit mode is completed, the DTMF receiver and the ROH timer are disabled. Thus, the switch neither listen for the DTMF signals nor disconnects the line when the ROH timer expires. Instead, the control of the line is transferred to the IP. Such IP may have a voice recognition detector and a DTMF signal receiver.

Both the NFA and Proxy protocol transmits a two-digit code during the call setup connection to the IP. By convention, a service code of "00" indicates the implicit mode of NFA, "01" indicates the implicit mode of Proxy, and "44" indicates the explicit mode for either protocol. The IP interprets the service code in order to determine the prompts and call flow options that will be provided to the caller. For example, when a caller line goes offhook, the IP receives a call setup with an implicit service code (i.e., "00" or "01") and the IP provides a "beep" prompt to the caller. If the caller dials "*44" to switch to an explicit directory management call, the implicit call is disconnected; the IP receives a new call setup from the switch with the "*44" service code; and the IP provides a prompt of directory management options. The IP handles this explicit directory management session as a separate call from the initiating implicit session.

One of the significant differences between the explicit and implicit modes is that the implicit mode has a short time period (10–20 seconds configured as the ROH timer) before a call is disconnected. Thus, there is a set time limit for the implicit mode to dial before a disconnect. The explicit mode, however, operates indefinitely with no timeout for automatic disconnect.

U.S. Pat. No. 5,452,340 to Engelbeck et al. ("Engelbeck") describes a method of interface between a voice activated dialing system and a user. The Engelbeck patent provides an option for the interface to add, remove, or change a name and corresponding telephone number in a telephone directory during the process of initiating a telephone call. However, the Engelbeck patent does not address any issues resulting from time constraints, such as the ROH timer.

SUMMARY OF THE INVENTION

When developing voice recognition grammars and call flows, the ROH time limit on the implicit mode severely restricts the call flow options for a dialog with the caller. For example, in the implicit mode there is not always enough time for the caller to perform spoken number dialing (e.g., "dial 512-555-1212") since it typically takes longer than spoken name dialing (e.g. "John Smith"). Spoken number dialing allows the caller to have the option of saying "dial 512-555-1212" and the voice recognition system confirms the recognition by announcing "Calling 5-1-2-5-5-5-1-2-1-2", and then dials the number. Depending on the talking speed of the caller, there may not be enough time to complete the dialing before the ROH timer disconnects the call. As another example, during any spoken dialing session, the first attempt may not be properly recognized. In this situation, it is desirable to allow the caller multiple attempts. However, due to the ROH time restriction, the call flow dialog with the caller and the number of retry attempts must be limited. Therefore, the human factors of the call dialog are not optimal.

In accordance with the present invention, a blended callflow method is described in which an automatic transition from implicit to explicit mode is initiated anywhere within the call flow dialog of an implicit VAD call session, without the caller's explicit command. According to the present invention, a spoken digit dial option is added to the caller option for dialing, where it allows a mode detailed call flow and allows the caller to confirm the number's accuracy, prior to dialing, without automatic disconnect.

The present invention also provides for extending the spoken name dialing call flow to allow for multiple recognition retries and extended announcement instructions, without an automatic disconnect. There is also an option wherein the voice recognition system switches to the explicit mode if the system determines that voice input is being received near the expiration of the ROH timer.

The present invention further provides for retaining the call context information and voice recognition results from the initial implicit session and using that information in the subsequent explicit session to seamlessly continue the call flow dialog with the caller.

DETAILED DESCRIPTION OF THE INVENTION

Figure 1:
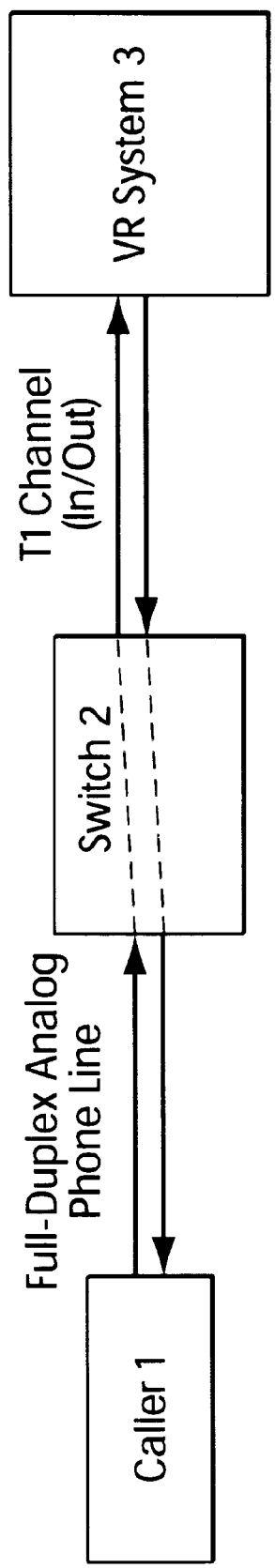
FIG. 1 shows a schematic diagram of the system architecture of a preferred embodiment according to the present invention.

The present invention presents a method for automatically switching between different calling modes. As shown in FIG. 1, a basic architecture of the present invention includes a caller/user 1 who, using a Voice Recognition System (VR) 3, completes a call handled by a telephone network switch 2. The VR 3 can be of any known type, for example, Infusion™ IP4000 by DSC Communication Corporation that provides the Bell Atlantic Easy Voice service.

Figure 2:
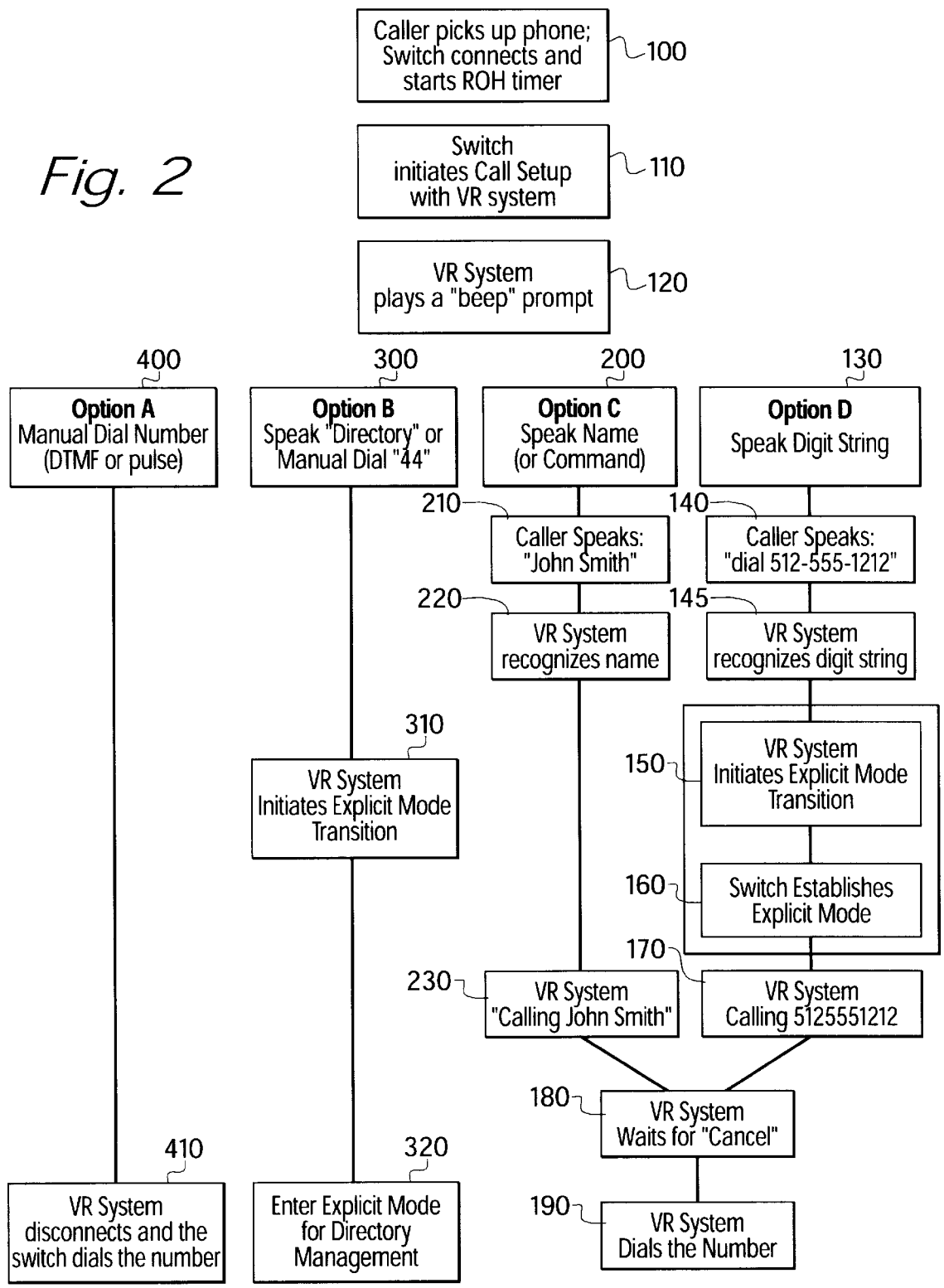
FIG. 2 shows a flow chart of software for implementing a blended callflow dialog according to the present invention.

FIG. 2 shows a flowchart for software used to implement the present method in the VR 3. In step 100, the caller 1 takes the telephone handset offhook; the switch 2 connects to the caller line; and the switch 2 activates the ROH timer.

Figure 3:
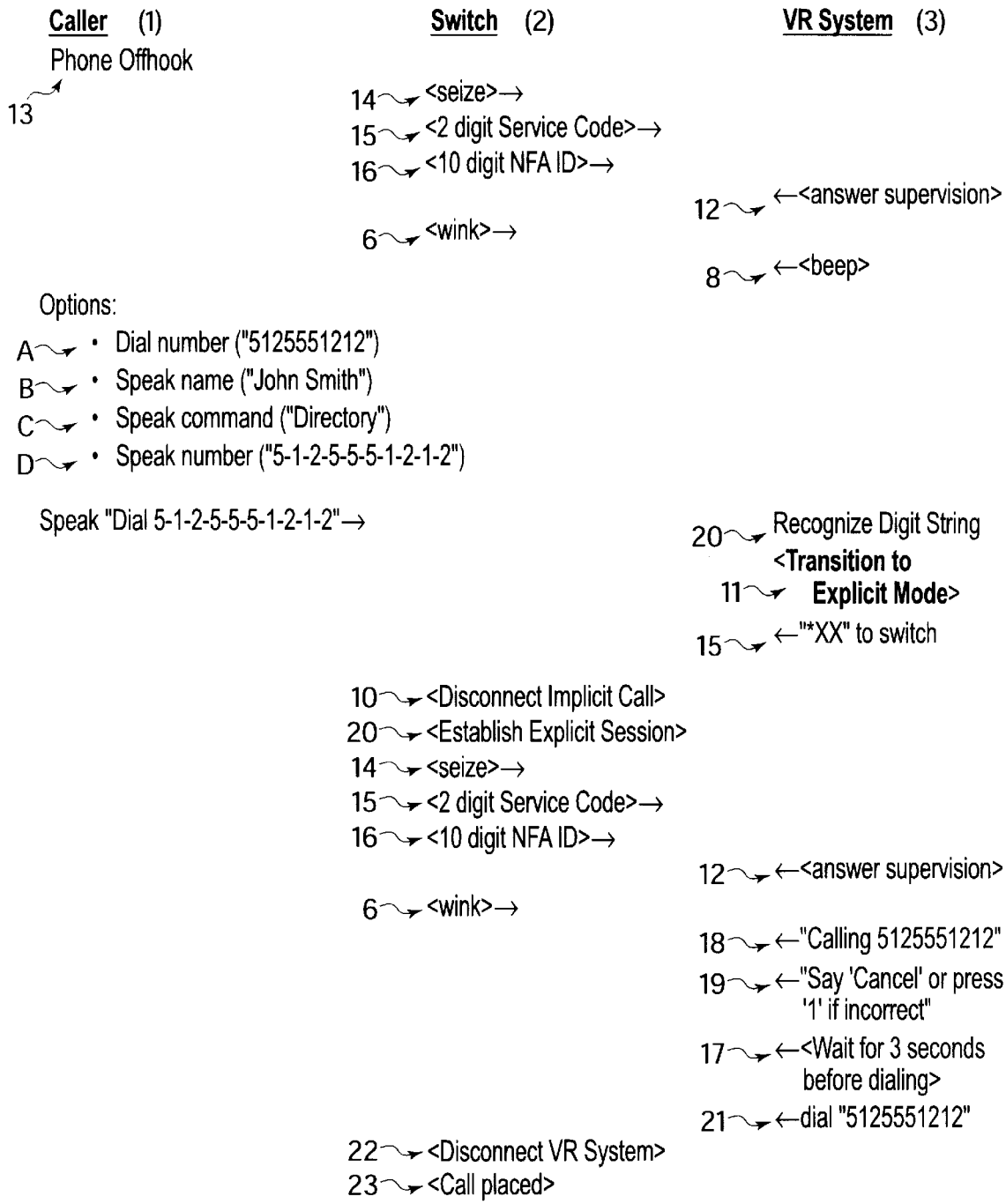
FIG. 3 shows a detailed diagram of the manner of switching between explicit and implicit calling modes in the present invention.

In step 110, the switch 2 initiates call setup 16 with the VR 3. The call setup 16 includes each of the following steps as shown in FIG. 3. First, the switch 2 sends a seize signal 14, followed by DTMF tones for a two digit Service Code 4, and a ten digit Network Facility Access code (NFA) 5 to the VR system 3. The NFA code 5 is a telephone number for the caller's line. The VR system 3 responds to the switch 2 with an answer/supervision signal 12 which indicates a transition from the onhook state to the offhook state. Finally, the switch 2 sends a wink 6 to the VR system 3 to complete the call setup between the switch 2 and the VR 3.

In a step 120, the VR 3, plays a "beep" prompt for the caller 1. The caller 1 now has, for example, four options. Option A (step 400) is to dial a number, for example, "5125551212" using DTMF or pulse. Option B (step 300) allows the caller 1 to speak a command, for example, requesting a directory of available numbers by saying, for example, "Directory". This step can also be performed using DTMF input, e.g., *44. In that option, as is known in the art, the system goes into explicit mode, goes into the system directory, and allows, e.g., the caller to enter a new name in the directory. Option C (step 200) is to speak a name, for example, "John Smith". In this option, as is known in the art, the system looks up the spoken name in a directory, and dials a corresponding number. The advantage of the present invention is that the caller 1 has an additional option D (steps 130–180) which allows him or her to speak the desired number as a digit string, for example, "5-1-2-5-5-5-1-2-1-2" (step 130). The caller 1 has to say, for example "Dial 5-1-2-5-5-5-1-2-1-2" for this option to initiate.

The VR system, upon receiving the option D, i.e., upon recognition of a spoken string of digits, (step 145) initiates the transition from an implicit mode that the switch is currently on, to an explicit mode 11. The initiation is done by sending a signal 15 to the switch 2 (step 150). The signal 15 from the VR 3 may, for example contain "*XX" which is recognized by the switch 2 as a request for initiation the explicit mode 11. It is to be understood that recognition of the spoken digits strings is accomplished by the same recognition software, e.g. C, assembly language or any other programming language used to recognize spoken names or commands in the VAD service.

In addition, the VR system 3 may send a request for initiation of the explicit mode 11 when it recognizes that the ROH timer is about to expire (for example 2 or 3 seconds left on the ROH timer) and the caller has not finished executing a spoken command or a spoken name.

Upon receiving the initiation signal 15 from the VR system 3, the switch 2 disconnects the implicit mode 10, and then establishes the explicit mode 20 (step 160). The switch 2 then sends the seize signal 14 together with the two digit Service Code 14 and the ten digit NFA code 15 to the VR system 3 (in the same manner as in the implicit mode). The VR system 3 responds with the answer/supervision 12. The switch 2 then sends the wink 6 to the VR system 3 (also in the manner as the implicit mode).

The VR system 3 responds by sending an announcement 18, for example, that it is "calling 5125551212" (step 170). If the announced number is incorrect, then the caller 1 is given, for example two options 19: to say "Cancel" or to press "1" (or any other number). The VR system 3 has a pause 17, for, e.g., three seconds to see if the caller inputs one of these choices (step 180). If the caller 1 does not respond, for example, within 3 seconds, the VR system 3 dials 21 the number (step 190), for example, "5125551212". This dialing is done in the same manner as the spoken name of step 200. Once the number is dialed and the call is placed the switch 2 disconnects 22 the VR system 3 and the switch 2 places call 23.

Figure 4:
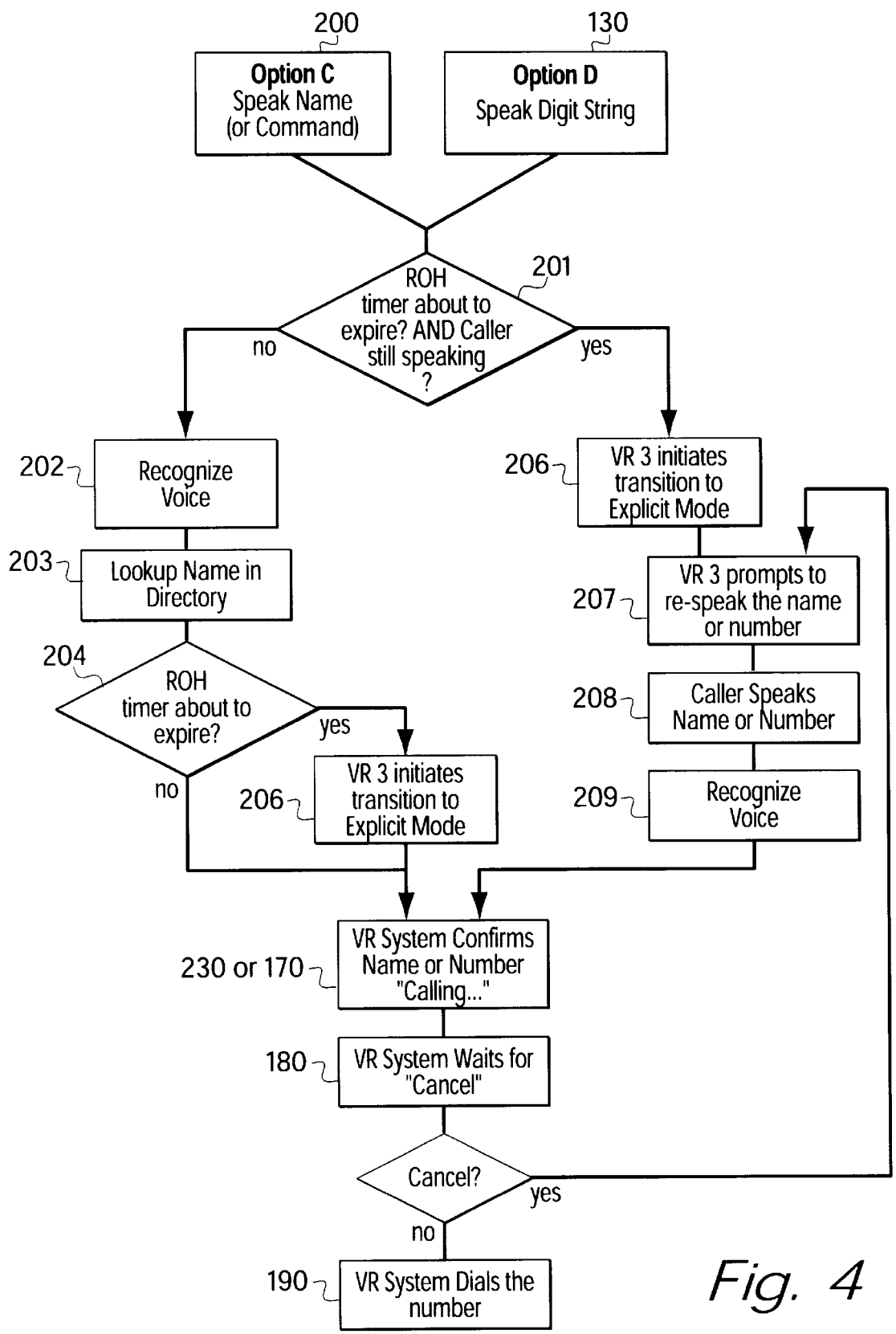
FIG. 4 shows a detailed diagram of additional situations when transition from the implicit to the explicit mode occurs according to the present invention.

FIG. 4 shows a flowchart for software for implementing additional features of the present invention. After the initial "beep" prompt, the caller 1 can speak one of several options commands. FIG. 4 shows the option C (name dialing) and the option D (number dialing). In step 201, while the caller is speaking, the VR system 3 monitors the amount of time that has transpired to determine if the ROH timer is about to expire (i.e., is within a predetermined time threshold, e.g., three seconds from the ROH timeout). If the VR system 3 determines that the ROH timer is about to expire, and the caller 1 is still speaking, the VR system 3 will automatically transition to the explicit mode (step 206), avoiding the ROH timeout; re-prompt the caller 1 for voice input (step 207), listen for the caller 1 to re-speak the phrase (step 208); recognizes the spoken name or number (step 209); and continue through the remaining voice dialing call flow.

If the ROH time is not about to expire, the VR system 3 continues until it recognizes a spoken name or number (step 202). If a number is recognized the call flow described in FIG. 2 is as follows. If the spoken name is recognized, the VR system 3 continues in the implicit mode. The VR system 3 looks up the corresponding number in the directory (step 3). While still in the implicit mode, the predetermined threshold of the ROH timer is being monitored (step 204) to determine if at any point the VR system 3 needs to be transferred to the explicit mode (step 205). Once an explicit mode transfer is preformed after a successful recognition (step 205), the recognition results are maintained by the VR system 3 and used in the subsequent confirmation prompting to the caller 1 (step 230 or 170).

Table 1 shows an exemplary timing for the blended callflow.

TABLE 1

| 2 sec | 5 sec | 2 sec | 6 sec | 3 sec | 2 sec |
|---|---|---|---|---|---|
| implicit call Setup 6, 12, 13, 14, 15, and 16 | <beep 8> | Caller 1 says "Dial 512555-1212" | Initiating and switching to the explicit mode 10, 11, 15, 20 | VR System 3 says "Calling 512555-1212" | <pause 17> | VR System 3 dials 512555-1212 |

The advantages of the present invention is that it allows an automatic transfer from the implicit mode to the explicit mode upon recognition of a spoken digit string or spoken commands near the expiration of the ROH timer, which transfer mode could, for example, take up to two seconds to exchange in-band signaling, i.e. sending DTMF signals to the switch. This time delay must be positioned in the callflow at a natural pause location that is not obtrusive to the caller; the position between the spoken digits and the announcement of those digits is such a Location. If the DTMF in-band signaling signals occur during spoken input, those DTMF signals will cut off voice signals and hamper proper voice recognition.

Another feature of the present invention is that during the transfer to the explicit mode, the switch 2 terminates the implicit mode; disconnects from the VR system 3; and then initiates a new explicit call session. The new session will contain an explicit service code (e.g., either "*44" or a special service code for transitions). During the implicit mode session, the VR system 3 may have successfully completed recognition and completed a portion of the call flow. In order to allow the explicit session to resume the call flow dialog without interruption, the VR system 3 must retain the recognition results and call flow information from implicit session and supply this context information to the new explicit session. This information can be stored in any known memory or buffer in the VR system 3. Since the call setup for both the implicit and the explicit mode sessions contain the same caller access number, the VR system 3 can associate two sequential sessions from the same caller and transfer the context information.

The present invention may be written in any conventional programming languages. Also, the present invention, with minor alternations apparent to those skilled in the art, may be adopted to work with switches and switch protocols used by Nortel, AT&T, or Bell Atlantic or any other switch manufacturer.

As used herein the term "dialing" includes any method of connecting a telephone through a telephone network switching system to one or more other telephones.

The present invention will be recognized by those skilled in the art that a variety of variations may be made in the construction of the above invention without departing from the claims. As such, the scope of the above invention is be limited only by the claims appended hereto.

What is claimed is:

1. A method for a voice recognition dialing, comprising the steps of:
   placing a telephone offhook;
   sending an offhook signal via a line to a switch, the switch including a receiver offhook timer, the receiver offhook timer having an expiration time period;
   coupling the telephone to a voice recognition system; and
   connecting the telephone to a desired number, the connecting step including the following sub-steps:
      speaking a digit string into the voice recognition system,
      recognizing the spoken digit string,
      automatically transferring the switch between a first mode and a second mode upon recognition of the spoken digit string,
      automatically disabling the receiver offhook timer, and
      dialing the digit string using the voice recognition system.

2. The method according to claim 1, wherein connecting step further includes the following substeps:
   before the dialing substep, providing an announcement of the digit string recognized during the recognizing substep, and
   before the dialing substep, pausing for a predetermined time period.

3. The method according to claim 1, further comprising the step of:
   after the sending step, activating the receiver offhook timer to count the expiration time period.

4. The method according to claim 3, wherein the transferring substep includes the following step:
   transferring the switch from the first mode to the second mode if an input into the voice recognition voice system is detected within a predetermined time before the expiration of the expiration time period.

5. The method according to claim 1, further comprising the step of:
   using the switch, disconnecting the line upon expiration of the expiration time period.

6. The method according to claim 1, wherein the connecting step further includes the following substep:
   speaking a name into the voice recognition system.

7. The method according to claim 1, wherein the connecting step further includes the following substep:
   speaking a command into the voice recognition system.

8. The method according to claim 7, wherein the connecting step further includes the following substep:
   transferring the switch from the implicit mode to the explicit mode if an input into the voice recognition system is detected at a predetermined time before the expiration of the expiration time period.

9. The method according to claim 1, wherein the first mode includes an implicit mode and wherein the second mode includes an explicit mode.

10. The method according to claim 9, wherein the transferring substep includes the following step:
    transferring the switch from the implicit mode to the explicit mode.

11. The method according to claim 1, the connecting step further includes the following substep:
    retaining and restoring voice recognition results and call flow context information during the transferring substep.

12. A method for a voice recognition dialing, comprising the steps of:

placing a telephone offhook;

sending an offhook signal via a line to a switch, the switch including a receiver offhook timer, the receiver offhook timer having an expiration time period;

activating the receiver offhook timer to count the expiration time period;

connecting the telephone to a voice recognition system;

recognizing a spoken input which is provided via the voice recognition system;

automatically transferring the switch between a first mode and a second mode upon recognition of the spoken input during a predetermined time before the expiration of the expiration time period;

automatically disabling the receiver offhook timer; and dialing the spoken input.

13. The method according to claim 12, further comprising the step of:

providing an announcement requesting an additional spoken input after the transferring step.

14. The method according to claim 12, further comprising the step of:

using the switch, disconnecting the line upon the expiration of the expiration time period.

15. The method according to claim 12, wherein the first mode includes an implicit mode and wherein the second mode includes an explicit mode.

16. The method according to claim 15, wherein the transferring step further includes the following substep:

transferring the switch from the implicit mode to the explicit mode.

17. The method according to claim 12, further comprising the step of:

retaining and restoring voice recognition results and call flow context information during the transferring step.

18. A system for a voice recognition dialing, comprising:

a telephone;

a voice recognition system being coupled to the telephone, the voice recognition system being capable of recognizing a digit string which is spoken into the telephone;

a switch including a receiver offhook timer, the receiver offhook timer having an expiration time period, the switch being in a first mode and capable of being transferred into a second mode, the switch receiving an offhook signal after the telephone is placed into an offhook position; and a switching arrangement capable of switching the switch from the first mode to the second mode, wherein, upon recognition of the spoken digit string by the voice recognition system, (a) the switch is automatically transferred between the first mode and the second mode, (b) the receiver offhook timer is automatically disabled, and (c) the digit string is dialed using the voice recognition system.

* * * * *